June 3, 1952 P. W. WYCKOFF 2,599,507
GAS TURBINE FUEL REGULATOR WITH MANUAL AND TEMPERATURE
RESPONSIVE MEANS TO SELECT FUEL-AIR RATIO
Filed July 25, 1947 3 Sheets-Sheet 2

INVENTOR.
Paul W. Wyckoff.
BY
Harness and Harris
ATTORNEYS.

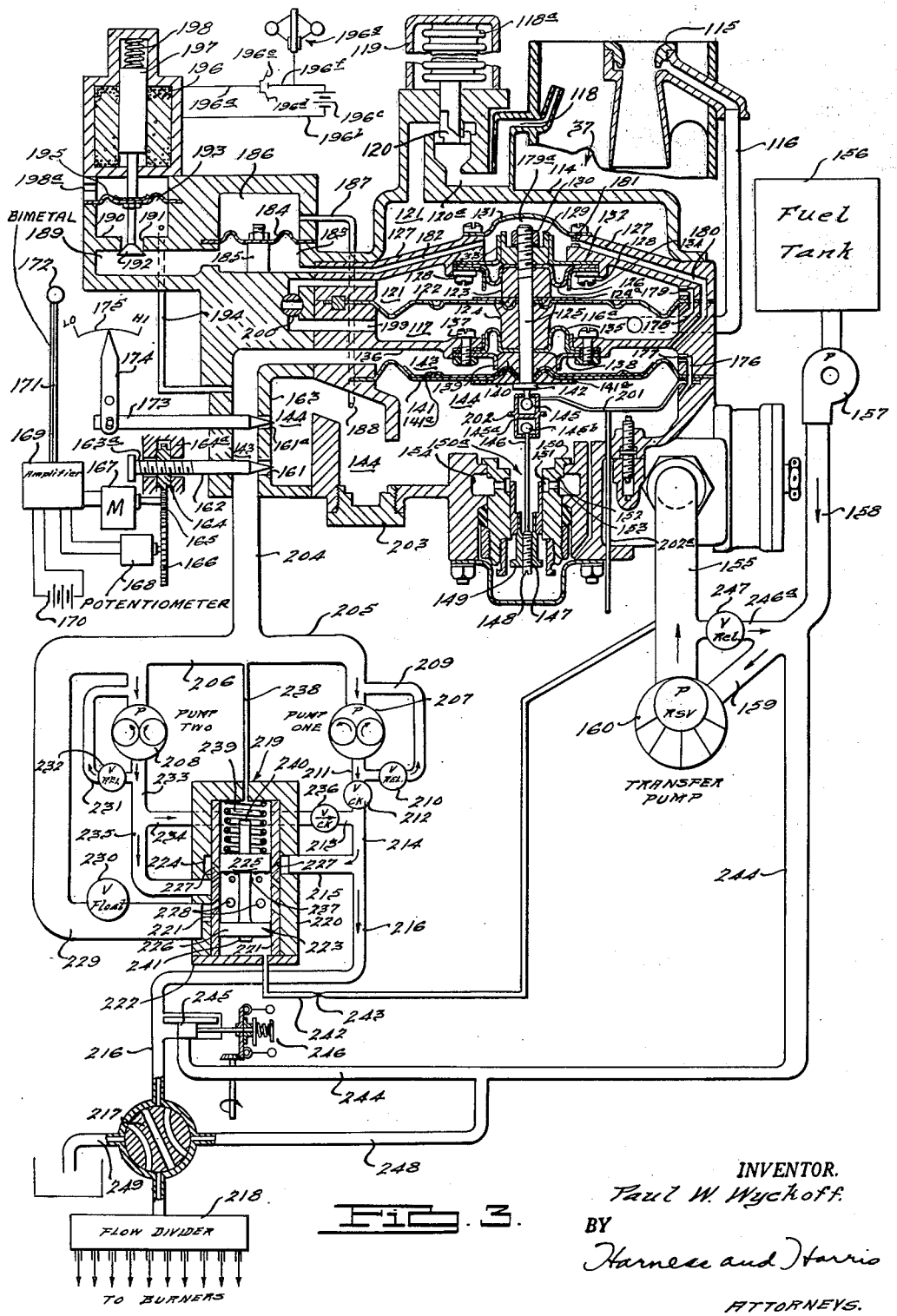

Patented June 3, 1952

2,599,507

UNITED STATES PATENT OFFICE 2,599,507

GAS TURBINE FUEL REGULATOR WITH MANUAL AND TEMPERATURE RESPONSIVE MEANS TO SELECT FUEL-AIR RATIO

Paul W. Wyckoff, Dayton, Ohio, assignor to Chrysler Corporation, Highland Park, Mich., a corporation of Delaware Application July 25, 1947, Serial No. 763,467

1 Claim. (Cl. 60—39.28)

This application relates to a control for a burner. More specifically it relates to controlling a burner adapted to supply products of combustion driving a gas turbine.

An object of the present invention is to provide a system maintaining a predetermined temperature for hot gases driving a gas turbine. There is some difficulty with a direct temperature control by which a device measuring directly the hot gas temperature will regulate this temperature. This temperature is very high and varies considerably. Thus such a device must be able to withstand the very high hot-gas temperature and still be flexible enough to respond to its wide variations. I have invented a system whereby the maintenance of the hot-gas temperature is based on the temperature of air entering a burner producing the hot gases. The entering-air temperature is lower and is relatively constant. for this temperature a satisfactory measuring device is more easily obtained.

A further object is to provide a control responsive to the hot-gas temperature itself for acting in conjunction with the control based on entering-air temperature. The hot-gas temperature control will be operative if that temperature becomes excessive for any reason.

Another object of the invention is to associate these controls with a carburetor proportioning fuel and air flowing to the burner, whereby the controls appropriately modify the proportions of fuel and air.

Still another object is to provide a servo mechanism for operating a regulator for the flow of liquid such as fuel, which servo mechanism itself operates on the liquid being regulated. This servo mechanism may be used to operate a flow regulator employed to proportion fuel and air supplied to a burner producing hot gases for a gas turbine.

Other objects will appear from the disclosure.

In the drawings:

Fig. 3 shows the use of controls of the present invention applied to a fuel-and-air-metering device of another type.

Figure 1:
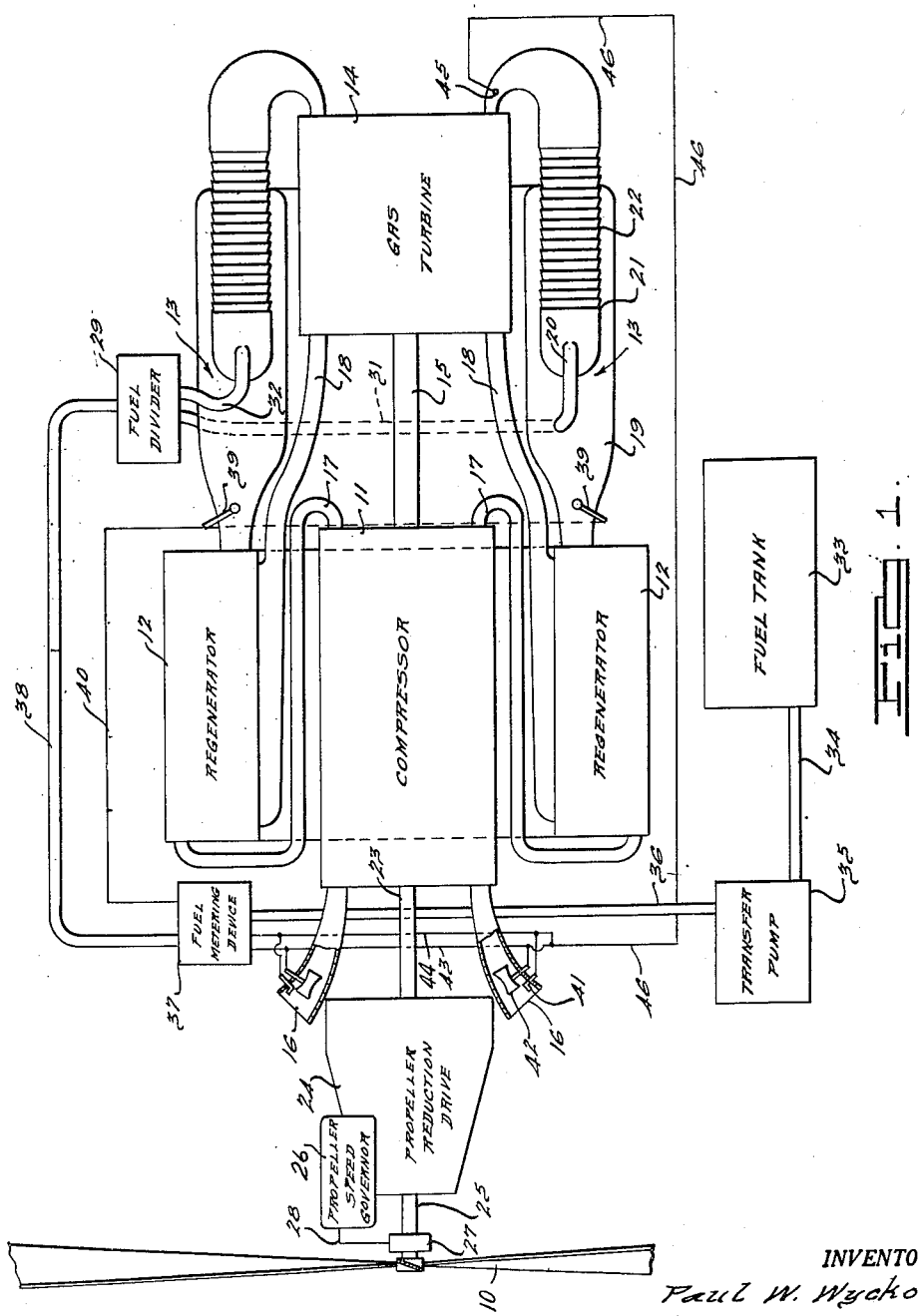
Fig. 1 is a partially diagrammatic view showing a power plant including a gas turbine to which the controls of the present invention are shown to be applied.

Fig. 1 shows a power plant for driving an airplane properller 10. The power plant comprises a compressor 11, a regenerator 12 surrounding the compressor, a plurality of burners 13, and a gas turbine 14. The gas turbine 14 is driven by hot gases produced by the combustion of fuel and air in the burners 13, and drives the compressor 11 through appropriate connecting means represented by the reference-character 15. The compressor 11, which may be of the axial type, draws in air at its left end through scoops 16. Compressed air is delivered from the right end of the compressor 11 into conduit means 17 which lead the compressed air to the regenerator 12. The compressed air follows a zig-zag path through the regenerator 12 and is thereby heated by exhaust gases passing from the gas turbine 14 through conduit means 18 to the regenerator 12. Heated compressed air passes from the regenerator 12 through conduit means 19 which enclose the burners 13. Each burner is formed of a fuel nozzle 20 and an air tube 21 formed in its intermediate portion of nested frustum-like sections 22, which permit the air to pass through the tube wall to the nozzles 20. The tubes 21 are curved at their ends to direct the streams of hot gases formed in the burners 13 toward the end of the gas turbine 14, which is positioned within the burners 13. For a more complete showing of the arrangement of compressor, regenerator, burners, and gas turbine, reference is made to the copending application of Staley and Williams, Serial No. 715,840, dated December 12, 1946. For a more complete showing of the burner tubes 21 with the frustum-like sections 22, reference is made to the copending application of Samuel B. Williams, Serial No. 715,873, filed December 12, 1946.

The compressor 11, which has been previously described as being driven from the gas turbine 14 through means 15, is drivingly connected by means 23 with a propeller reduction drive 24, which in turn drives the shaft 25 on which the propeller 10 is mounted. Thus the propeller 10 is driven from the gas turbine 14 at a reduced speed. A propeller speed governor 26, which includes parts responsive to the speed of the propeller 10 is diagrammatically illustrated as regulating the propeller pitch control means 27 through a connection 28.

Fuel divider 29 is connected with the nozzles 20 through conduits 31 and 32. Fuel is fed from a gas tank 33 to a conduit 34 to a transfer pump 35. From the transfer pump 35 the fuel is led by a conduit 36 to fuel-metering device 37. Thence the fuel proceeds by way of a conduit 38 to the fuel divider 29.

Figure 2:
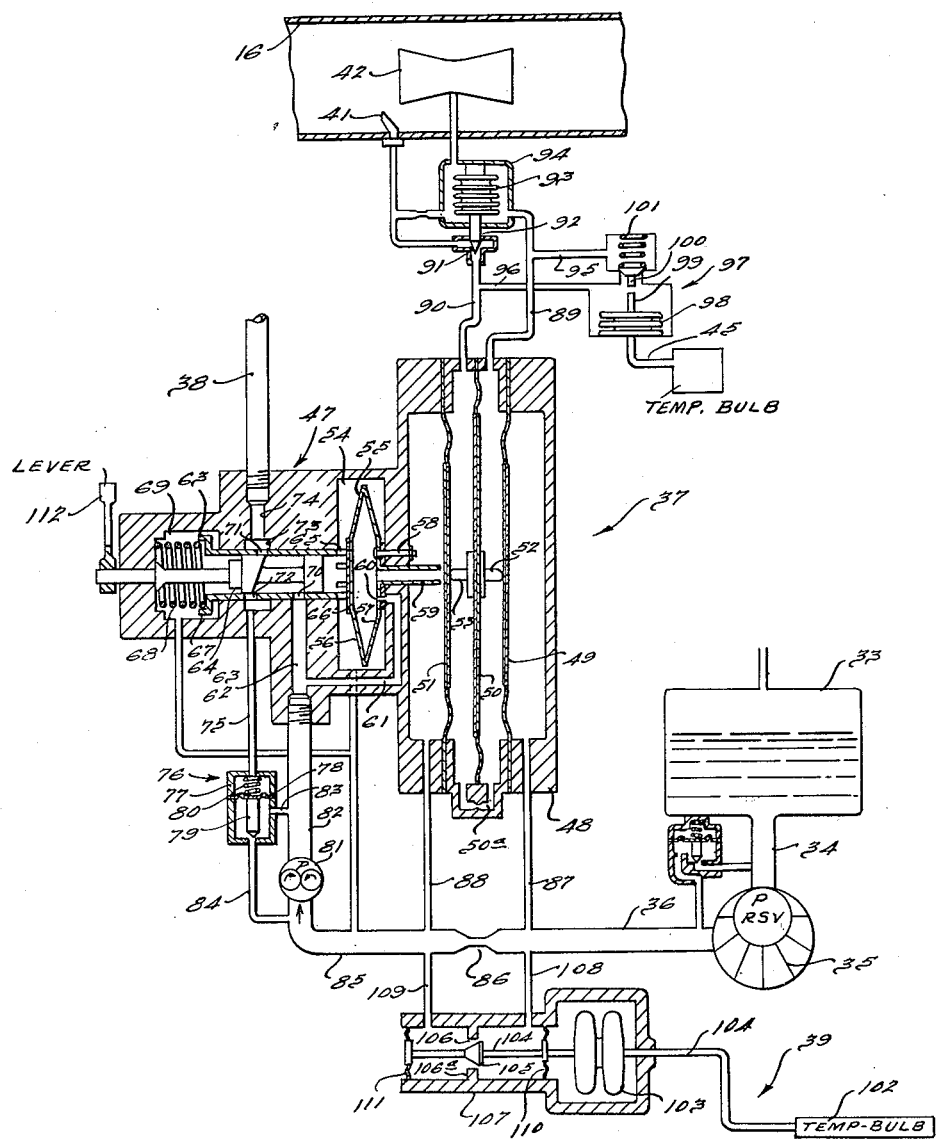
Fig. 2 is a view partially in section showing the application of the controls of the present invention to a fuel-and-air-metering device.

The fuel-metering device 37 is responsive to a plurality of controls. In the conduit means 19 is positioned a plurality of elements 39 responsive to temperature of the air passing from the regenerator 12 to the burners 13. The temperature-responsive elements 39 exert a control over the fuel-metering device 37 diagrammatically illustrated in Fig. 1 by the line 40. Each air scoop 16 carries conventional elements 41 and 42 for measuring the rate of air flow through the scoop; the air pressures acting upon these elements are transmitted to the fuel-metering device 37 by lines 43 and 44. Adjacent the inlet to the gas turbine 14 is a temperature-responsive element 45, which measures the temperature of the gases entering the turbine. This temperature element 45 acts through a means diagrammatically illustrated by the line 46 leading to the lines 43 and 44 to modify the air pressures transmitted from the air measuring elements 41 and 42 in the air scoop 16. The various controls just described as acting upon the fuel-metering device 37 will now be described in greater detail. In Fig. 2 the fuel-metering device 37 is seen to include a body 47 having a large hollow end 48 divided into a plurality of chambers by diaphragms 49, 50, and 51. The effective area of the diaphragm 50 is shown to be considerably larger than that of each of the diaphragms 49 and 51, and may, for example, be twice as large. The diaphragm 50 has an orifice 50ª at its lower side. Contactors 52 and 53 are attached to opposite sides of the central diaphragm 50 at its center so as to abut the diaphragms 49 and 51. An intermediate portion of the body 47 has a chamber 54 in which is mounted a servo-container 55. This container is formed of mating halves 56 and 57 of approximately concavo-convex shape. The container 55 is secured to an intermediate wall of the body 47 by means of a plurality of bolts 58, only one of which is shown. The container has a tubular extension 59 projecting to adjacency with the diaphragm 51 and providing an outlet from the container. The container outlet is variably restricted by the diaphragm 51, depending upon its position. The container 55 has an inlet 60 registering with an auxiliary fuel passage 61 formed in the body 47. The auxiliary fuel passage 61 branches from a main fuel passage 62 which leads to a regulating orifice or valve formed of a sleeve valve 63 and a piston valve 64 positioned within the sleeve valve and cooperating with it. The right end of the sleeve valve 63 is slotted as indicated at 65 and engages a reinforcement 66 attached to the container 55. The left end of the sleeve valve 63 is enlarged and flanged as indicated at 67 and is engaged by a coil spring 68, which acts between the said enlarged end and one end of a chamber 69 formed in the body 47, to urge the sleeve valve 63 to the right against the container 55. The sleeve valve 63 has an opening 70 in connection with the main fuel passage 62 in the body 47 and openings 71 and 72 which are opposite an annular recess 73 formed in the body 47. From one side of the annular recess 73 extends a passage 74 at which the line 38 leading to the burners is attached. From the other side of the recess 73 there extends a control line 75 to a bypass valve 76. This bypass valve comprises a body 77, a diaphragm 78, a needle valve 79, and a spring 80. The valve 76 is arranged to relieve a pump 81, which may be of the gear type as shown. The conduit 82 leads from the gear pump 81 to the main fuel passage 62 in the body 47. A line 83 goes from the conduit 82 on the pressure side of the pump 81 to the bypass valve 76, and a line 84 goes from the valve 76 to a conduit 85 leading to the intake of the pump 81. The pressure in the control line 75 leading to the relief valve 76 controls the pressure in the line 83 at which the valve 76 will bypass. The less the pressure in the line 75, the less the pressure in the line 83 need be in order to lift the needle valve 79 from its seat for causing bypassing by overcoming the resistance to lifting of the needle valve imposed by the pressure of the line 75 and diaphragm 78 and the pressure of the spring 80 upon the diaphragm. The pressure in the control line 75 is in turn dependent upon the drop in pressure produced by the restriction offered to the passage of fuel through the opening 72 in the sleeve valve 63 by the piston valve 64.

In the conduit 85 is placed means forming metering orifice 86 for the fuel passing through the conduit 85. Lines 87 and 88 lead from the conduit 85 at opposite sides of the metering orifice 86 to the two outer chambers in the enlarged end 48 of the body 47, transmitting two different fuel pressures to the diaphragms 49 and 51. The fuel pressures acting against the diaphragms 49 and 51 are opposed by air pressures within the diaphragms 49 and 51 transmitted through lines 89 and 90 leading from pressure-sensing elements 41 and 42 in each air scoop 16 as shown in Fig. 1. Line 90 has a variable orifice 91 controlled by a needle valve 92, in turn controlled by nitrogen-filled bellows 93, which increases in size and provides further restriction of the opening 91 with decrease in air density, thereby providing a density compensation to the air pressure transmitted to the diaphragms 50 and 51 through the line 90. The orifices 50ª and 91 combine in action to determine an actual difference of air force acting on diaphragm 50 for a given air-flow rate in line 16. The bellows 93 is mounted in a hollow member 94 which forms part of the line 89 leading from the pressure-sensing element 42 to the diaphragms. Bypass lines 95 and 96 lead from the lines 89 and 90 to a compensating device 97 which includes the element 45 responsive to temperature of hot gases entering the gas turbine. When this temperature exceeds a predetermined value, a bellows 98 forming part of the element 45 expands sufficiently under the action of a fluid within the element 45 to cause a piece 99 to contact and lift a valve 100. This places the lines 95 and 96 in communication with one another and tends to equalize the pressures in the lines 89 and 90 leading to the diaphragms. Thus the air signal to these diaphragms is reduced. A spring 101 urges the valve 100 to closed position.

The element 39, which has previously been described as responsive to the temperature of the air going from the regenerator 12 to the burners 13, is shown in Fig. 2 to comprise a part 102 exposed to the stream of air passing from the regenerator to the burners, a bellows 103, and a line 104 connecting the part 102 and bellows 103, and fluid contained in these members for expanding the bellows 103 as the temperature of the air stream from the regenerator 12 increases. The bellows 103 acts against a valve rod 104 carrying a head portion 105 adapted to vary the restriction of an opening 106 formed in a valve seat 106ª formed in a fitting 107. Lines 108 and 109 lead to the fuel conduit 85 at opposite sides of the metering orifice 86. Diaphragms 110 and 111 mounted in the fitting 107 keep fuel reaching the fitting 107 by way of the lines 108 and 109 from escaping endwise of the fitting 107.

It will be seen that the orifices 86 and 106 are in parallel with one another and that fuel may pass through both of them. The orifice 106 is decreased in size as the bellows 103 expands in response to an increase of temperature of air passing from the regenerator 12 to the burners 13. It may be considered that the orifice 86, previously described as being a metering orifice and the orifice 106 may be generally jointly considered as combining to form a metering orifice. This combined metering orifice varies in size in inverse proportion to the temperature of the air leaving the regenerator 12, since the orifice 106 varies in this way, and the orifice 86 is shown to be fixed.

The operation of the apparatus thus far described will now be set forth. Fuel travels from the gas tank 33 through the transfer pump 35 to the orifices 86 and 106. The rate of fuel flow past these orifices is measured by the lines 87 and 88 which transmit two different pressures to the outer sides of the diaphragms 49 and 51. If the air flow is proper for the fuel flow, then the three diaphragms 49, 50, and 51 will have a certain position determining a certain restriction of the outlet from the container 55 by way of the tubular extension 59. The pressures transmitted in the air scoops 16 by way of the elements 41 and 42 and the lines 89 and 90 will have a difference appropriate for the difference in fuel pressures transmitted through the lines 87 and 88 to the outer sides of the diaphragms 49 and 51, the difference in area between the diaphragm 50 and each of diaphragms 49 and 51 providing the requisite compensation. Thus with the air flow matching the fuel flow as stated, the resultant positioning of the diaphragms 49, 50, and 51, as shown, causes the diaphragm 51 to provide the aforesaid certain restriction of the outlet in the tubular extension 59 of the container 55. Thus the container 55 has an amount of expansion determined by the fuel flowing into the container by way of the passage 61 and the inlet 60 and the amount of outlet restriction provided by the diaphragm 51 to the tubular extension 59. Accordingly, the container 55 makes the valve sleeve 63 assume a position with respect to the piston valve 64, and the amount of restriction provided at the opening 71 in the valve sleeve 63 lets the proper amount of fuel flow through the conduit line 38 to the burners.

If now the rate of air flow through the scoops 16 changes, for example, decreases, then the difference of the pressures sensed by the elements 41 and 42 decreases. Thus in effect, the pressure transmitted by the line 90 to the left side of the middle diaphragm 50 decreases with respect to the pressure transmitted by the line 89 to the right side of the diaphragm 50. Accordingly, the three diaphragms will move to the left increasing the restriction to the outlet from the container 55 by way of the tubular extension 59, since for the moment, the difference in fuel pressures transmitted by the lines 87 and 88 has remained the same. Increase in the restriction of the outlet from the container 55 expands the container, thereby causing the valve sleeve 63 to move to the left and the restriction of the opening 71 in the valve sleeve 63 to increase. Thus less fuel flows, and the fuel-pressure difference transmitted through the lines 87 and 88 to the diaphragms 49 and 51 decreases. Finally, the final flow will be appropriate for producing a fuel-pressure difference effectively matching the air-pressure difference transmitted to the diaphragms from the sensing elements 41 and 42, and the diaphragm movement stops, fixing the restriction of the outlet of the container 55, the size of the container, the position of the sleeve 63, and the size of the opening therein.

If the air flow in the scoops 16 increases from what it was at the first described condition, then the difference in pressures transmitted by the lines 90 and 89 to the diaphragms increases over what it was at the first described condition, causing the three diaphragms to move to the right from the position shown in Fig. 2, respective of the first described condition. Thus the restriction of the escape opening of the servo-container 55 is decreased, the container collapses, the sleeve valve 63 is moved to the right under the action of the coil spring 68, and the effective opening of the valve port 71 in the sleeve valve 63 is increased. Thus there is an increase in the fuel flow, which is reflected as an increase in fuel pressure difference transmitted by the lines 87 and 88 to the diaphragms 49 and 51, bringing about a new position of the equilibrium. This new position will be somewhat to the right of that shown in Fig. 2.

Let us now consider the effect of the density compensation bellows 93. If the density decreases, for example, at increased altitude, the actual weight of air flowing through the air scoops 16 will decrease for a given rate of volume flow. If the actual weight of air decreases, then the weight of fuel should decrease to produce a predetermined temperature of hot gases entering the turbine. However, if there is no decrease in volume of air flow, there is no decrease in pressure differences transmitted through the elements 41 and 42, which pressure difference determines the rate of fuel flow. The bellows 93 by causing the contoured needle valve 92 to restrict the orifice in the line 90 provides a compensation for the decrease in density air flowing through the scoops 16. As the air density decreases, the bellows 93 expand, causing the needle valve 92 to increase the restriction in the line 90. Thus the pressure finally transmitted by the line 90 to the left side of the diaphragm 50 is less than the pressure sensed by the element 41. The resultant decrease in pressure transmitted produces an appropriate decrease in pressure difference acting upon the bellows, and this appropriate decreased pressure difference acting on the diaphragm produces an appropriate decrease in fuel flow.

The element 45 responsive to temperature of hot gases entering the turbine 14 comes into action only when this temperature exceeds a predetermined value. At this time, as previously described, the bellows 98 causes the part 99 to lift the valve 100 from its seat. Thus the lines 95 and 96 are placed in communication, and there is a tendency to equalize the pressure in the lines 89 and 90, dependent upon the restriction in the communication between the lines 95 and 96 offered by the valve 100. This tendency toward equalization of pressures in the lines 89 and 90 means a decrease in difference in air pressures transmitted to the diaphragms 49, 50, and 51 from the difference in pressures sensed by the elements 41 and 42. Thus the fuel flow is appropriately reduced to bring the temperature of hot gases entering the turbine down to the desired value.

Let us now consider the effect of change in the restriction of the orifice 106 by shifting of the valve 105 in response to change in temperature of air passing from the regenerator 12 to the burners 13. Let us assume that the temperature of air delivered from the regenerator 12 increases, for such a reason as improvement in regenerator efficiency or increase in temperature of air entering the compressor through the scoops 16. The air reaching the burners 13 must now be heated a lesser amount to produce a predetermined temperature at the entrance to the gas turbine. Thus the rate of fuel flow should be decreased for a given rate of air flow. This is accomplished by the temperature-controlled orifice 106. Increase in temperature of air coming from the regenerator 12 causes the bellows 113 to expand and thereby to move the valve 105 nearer the seat 106ª. Thus the restriction of the orifice 106 is increased, and less fuel flows through the line 85, since the size of the orifice 86 is kept constant. The total effective restriction provided by the orifices 86 and 106 is increased, and thus to maintain a given difference of fuel pressure transmitted through the lines 87 and 88 of the diaphragm to balance a continuing difference in air pressure transmitted to the diaphragms representative of a given air flow in the scoops 16, the rate of fuel flow must decrease.

Angular position of the piston valve 64 is controlled by a pilot-operated arm 112. Within certain limits the position of the arm 112 has no effect upon the temperature of the gases going to the turbine, but beyond this limit there is some effect. It will be observed that the piston valve 64 has an inclined land at the openings 71 and 72 in the valve sleeve 63, which through an angular shift of the valve 64 by the arm 112 changes the size of the valve openings 71 and 72 for a given position of the valve sleeve 63. Suppose, for example, that the angular position of the valve 64 is changed so as to provide a reduction in the size of the openings 71 and 72 for a given position of the valve sleeve 63. Then less fuel will flow, the fuel pressure difference transmitted through the lines 87 and 88 to the diaphragms will be less, and the diaphragms will move to the right, thereby decreasing the restriction of the outlet in the container 55. This permits the container to collapse to a certain extent, the spring 68 moves the valve sleeve 63 to the right, and the openings 72 and 73 in the valve sleeve 63 are increased in size. Thus the fuel flow is returned to the original value it had before the valve 64 was angularly shifted by the control arm 112. Since the fuel flow remains the same (and it has been assumed that there has been no change in air flow) there is no change in the temperature of the gases going to the turbine. If the valve 64 is shifted farther through the control arm 112 to provide further restriction of the openings 71 and 72 in the valve sleeve 63, the servo-container 55 will further collapse. Eventually a point will be reached at which the sleeve valve 63 can no longer follow the container 55 as it collapses, because the flange 67 on the valve sleeve 63 has come into engagement with the right end of the chamber 69. Beyond this point, decrease of the valve openings 71 and 72 through angular shifting of the piston valve 64 by the control arm 112 is permanent in the sense that the sleeve valve 63 can no longer shift to compensate for the shift of the piston valve 64, and thus there results a correspondingly permanent reduction in the flow of the fuel and a reduction in the temperature of the gases flowing to the turbine.

There may be also an adjustment of the temperature of the gases flowing into the turbine through a replacement of the means forming the metering orifice 86 by a new means forming an orifice of a different size. If the new orifice is larger than the old one, the fuel flow therethrough will be greater for a given pressure difference transmited through the lines 87 and 88, the fuel-air ratio will be greater, and the temperature of the gases reaching the turbine will be increased. If the new orifice is smaller than the old one, the opposite effect will take place; the fuel-air ratio will be decreased, and the temperature of gases entering the turbine will be decreased.

Fig. 3 shows another form of apparatus to which the inventive principles of the present application are applied. Reference character 114 designates a body which may be formed of several parts and through which fuel is passed for regulating purposes. A velocity-pressure-sensing element 115 is positioned in an air line, for example, the scoop 16 leading to the compressor 11. A line 116 connects the element 115 with the body 114, the line 116 having an opening 116ª to an air chamber 117, formed in the body 114 below a diaphragm 122. An impact-pressure-sensing element 118 is also positioned in the aforementioned air line. The element 118 is shown to be formed to be part of the body 114 and includes a pressure-compensating nitrogen-filled bellows 118ª mounted on the inside of the top of a container 119. Bellows 118ª contains nitrogen at some pressure dependent on conditions such as the spring rate of the bellows and compensates for temperature and pressure. The bellows 118ª contracts with pressure and expands with temperature, and therefore, assumes a position dependent on density, which is proportional to ratio of pressure to temperature. A valve 120 is connected with the nitrogen bellows 118ª and is adjustably positioned by the bellows to establish a restriction in a line 120ª transmitting the signal received by the pressure element 118 to an air chamber 121 formed in the body 114 above the diaphragm 122. Mounted within the body 114 is an air diaphragm 122. The pressure of air sensed by the element 118 is transmitted to the upper side of this diaphragm, and the pressure sensed by the element 115 is transmitted to the lower side of the diaphragm. Whenever air is flowing, the pressure on the upper side of the diaphragm 122 will be greater than the pressure on the lower side thereof, and the difference in these pressures is a measure of the square of the air flow. The diaphragm 122 is held between a collar 124 and a ribbed disk washer 124ª, mounted upon a rod 125. Above the washer is collar 123, above which is a diaphragm 126, which is secured to bridge portions 127 of the body 114 by screws 128. The collar 123 and a collar 129 clamp the diaphragm 126. The collar 129 has a recess receiving a nut 130 having threaded engagement with the rod 125. The bridge portions 127 are connected by a cover 131 which extends over the top of the rod 125. Clamped between the diaphragm 126 and the bridge portions 127 is a guide 132 having a flange 133 in which the collar 129 slides. The diaphragm 126 is retained in a flanged support 134, which is clamped to the bridge portions 127 by the screws 128. The collar 124 rests in a diaphragm 135, which closes an opening in a wall 136 dividing the body into an air section and a fuel section. Bolts 137 secure the diaphragm 135 to the wall 136. These bolts also support a guide 138 having a flange 139 receiving a collar 140. Collar 140 holds a diaphragm 141 against a ribbed disk washer 141ª, which rests against a shoulder 142 on the rod 125. The various diaphragms and collars just described are held clamped between the shoulder 142 on the rod 125 and the nut 130 engaging the upper threaded end of the rod 125. The diaphragm 141 divides the fuel section into a metered-fuel chamber 144 and an unmetered-fuel chamber 143. The lower end of the rod 125 is formed as a ball 145, which is mounted in a connecting means 145a, which also mounts a ball 145b on the upper end of a rod 146. The lower end of the rod 146 has a threaded portion 147 and a slot 148 for adjusting purposes. The threaded portion 147 engages a movable inner sleeve valve 149, which is slidably mounted in a fixed outer sleeve valve 150. The valves 149 and 150 comprise an adjustable regulating orifice 150.

The outer valve 150 has an inner annular recess 151, an outer annular recess 152, and connecting radial openings 153. As shown in Fig. 3, the inner valve 149 partially overlaps the inner recess 151 of the outer valve so as to restrict the openings formed therein. The outer annular recess 152 of the outer valve 150 is in registry with an annular recess 154 formed in the body 114. The recess 154 is in communication through means not shown, with a supply conduit 155. Fuel comes from a fuel tank 156 to a booster pump 157, which may be of the centrifugal type. Thence it proceeds by way of conduits 158 and 159 to a transfer pump 160, which may be of the rotary sliding vane type. The pump 160 delivers fuel through the conduit 155 to the recess 154 in the body 114. Thence the fuel proceeds through the regulating orifice formed of the sleeves 149 and 150 to the unmetered-fuel chamber 144 in the body 114 below the diaphragm 141. The unmetered fuel chamber has two outlets for fuel to the metered-fuel chamber 143, comprising orifices 161 and 161a formed in a wall 163. The effective size of the orifice 161 is controlled by a needle valve 162, the longitudinal position of which is adjustable for variation of the size of the orifice 161. The needle valve 162 has a threaded portion 163a, which is engaged by an internally threaded portion on a gear 164, which is held against conjoint axial movement with the needle valve 162 by a supporting means 164a, which embraces the gear 164. The needle valve 162 is held against rotational movement by means of a square hole in the casing 114 and a square portion on the needle valve, which is received by the square hole in the casing. The gear 164 is driven by a gear 165, in turn driven by a servomotor 167. The gear 165 also drives a gear 166 controlling a potentiometer 168. The servomotor 167 and the potentiometer 168 are suitably connected by wires with an amplifier 169, which is supplied by an electrical source of power 170. The amplifier receives a suitable electrical signal through means 171 from an element 172 positioned so as to be responsive to the temperature of air flowing to burners supplying a gas turbine. For example, the element 172 may be positioned between the regenerator 12 and the burners 13 in the conduit means 19 in the location of the temperature-responsive element 39 of Fig. 1. The needle valve 162 regulates the fuel orifice 161 in such a way that the size of the orifice varies inversely with the temperature of the air supplied to the burners, as measured by the element 172. The signal received through the means 171 from the temperature-sensitive element 172 is suitably magnified by the amplifier 169 by the electrical energy received from the source of power 170. Changes in the electrical signal, thus amplified cause the servo-motor 167 to rotate the gear 165. Rotation of the gear 165 is effective by way of the gear 164 to provide longitudinal adjustment of the needle valve 162 and thereby adjustment of the fuel orifice 161. Rotation of the gear 165 is also effective by way of the gear 166 to adjust the potentiometer 168 to restore the entire electrical apparatus to balance. In other words, with the change in electrical signal, the servomotor 167 will operate to rotate the gear 165 indefinitely unless compensation is provided in an adjustment of resistance, and this is done through adjustment of the potentiometer 168 by the gear 166.

The fuel orifice 161a is regulated by means of a longitudinally adjustable needle valve 173, to which is connected a pivotally mounted indicator 174, having a point moving along suitable indicia 175, representing desired temperature of combustion products delivered by the burners to the gas turbine. The indicator 174 and needle valve 173 are shown in a mean position. Movement of the needle valve to the left, produced by clockwise angular movement of the indicator, increases the effective opening of the fuel orifice 161 and thereby increases the temperature to be reached by the products of combustion of the burners going to the turbine. Movement of the needle valve 173 to the right produced by counterclockwise angular movement of the indicator 174 will decrease the effective opening of the fuel orifice 161a and thereby decrease the temperature of the products of combustion produced by the burners.

The fuel chambers 143 and 144 above and below the diaphragm 141 are placed in communication by a passage 176 formed in the body 114 and having a restriction 177. Similarly, the air chambers 117 and 121 are placed in communication by a passage 178 formed in the body 114 and having a restriction 179. The metered fuel chamber 143 is in communication with a chamber 179a for fuel formed by the cover 131, the bridge portions 127, and the diaphragm 126. Communication is established through a passage 180 formed in the body 114 and having a restriction 181 at the end adjacent the chamber 179a. A passage 182 connects the chamber 179a with a chamber 183, formed below a diaphragm 184 carrying a projection 185 limiting the lower position of the diaphragm 184. Above the diaphragm 184 is a chamber 186, which communicates by a line 187 with the unmetered fuel chamber 144 through an opening 188. The chamber 183 is connected with a chamber 189 positioned below the wall 190 having an orifice 191 closed by a valve 192, as shown in Fig. 3. Above the wall 190 is a chamber 193, which communicates through a line 194 with the metered-fuel chamber 143. The top of the chamber 193 is formed by a diaphragm 195, which is connected to the stem of the valve 192 and prevents fuel from going from the chamber 193 into a solenoid 196. The solenoid 196 controls the valve 192 through a plunger 197, secured to the stem of the valve 192 in axial alignment therewith. The solenoid 196 is supplied by wires 196a and 196b from a source of electrical power 196c. Between the wire 196a and source 196c is connected a speed-responsive switch, which comprises spaced terminals 196d and 196e, connected to the line 196a, and a contactor at 196f, controlled by a means 196g responsive to turbine speed. More specifically the means 196g may be associated with the propeller pitch control governor. Propeller speed is directly proportional to turbine speed. The propeller governor is normally arranged so that a certain pitch produces a given speed range. Different given speed ranges may be preselected and thus a position of the arm 196$^f$ between the contacts 196$^d$ and 196$^e$ may be produced by different selected speed ranges. The arrangement is such that, when the turbine (or propeller) is operating in the desired speed range, the contactor 196$^f$ is positioned between the terminals 196$^d$ and 196$^e$ and out of contact with each of them so that no current flows to the solenoid 196. Under this condition, fuel pressure acting upwardly against the diaphragm 193 causes the plunger 197 to be displaced upwards from a central position in the solenoid 196 and the valve 192 to close the orifice 191, all as shown in Fig. 3. When the turbine is not operating in the desired speed range, the arm 196$^f$ will contact one of the terminals 196$^d$ and 196$^e$ causing current to be supplied to the solenoid 196, which now moves the plunger 197 downward to a central position and opens the valve 192, placing the chambers 189 and 193 in communication. A spring 198 acts against the plunger 197 to urge it downwards and thereby provides compensation for fuel pressure in the fuel chamber 193. The space above the diaphragm 195 is vented by an opening 198$^a$. The air chambers 117 and 121 are connected by a passage 199, which is shown to be closed by a valve 200. A spring 201 is connected at its right end to the body 114 below the diaphragm 141 in the unmetered fuel chamber 144. The left end of the spring 201 is engageable with a flange 202 formed on the connecting means 145$^a$ so as to provide a yielding limit to upward movement of the stems 125 and 146 and a minimum opening of the regulating orifice 150$^a$, formed by the valve 149 and 150. A rod 202$^a$ slidably mounted in the body 114 may be moved upwardly from the position shown to lift the spring 201 and thereby to remove the lower limit on the size of the regulating orifice 150$^a$. The fuel chamber has a drain plug 203.

A fuel line 204 extends from a region of the metered-fuel chamber 143 immediately to the left of the fuel orifices 161 and 161$^a$. The line 204 splits into branches 205 and 206, which lead to pumps 207 and 208, which may be of the gear type. A relief line 209 is connected to opposite sides of the pump 207 and contains a relief valve 210. The pump 207 discharges through a line 211 and a check valve 212 from which lead lines 213 and 214. The line 214 is formed into two branches 215 and 216. The latter line leads through a valve 217 to a flow divider 218 from which separate lines go to individual burners. The line 215 forms part of a bypass for pump 207 and leads to a valve 219 formed of a body 220, a sleeve 221 positioned therein, a cover 222 and a balanced piston valve 223 slidable within the sleeve 221. The line 215 leads directly to an annular recess 224 formed in the body 220 about the sleeve 221. The annular recess 224 communicates with the space between sections 225 and 226 of the piston valve 223 by way of passages 227 formed in the sleeve 221. Passages 228 in the sleeve 221 provide communication from the space between the piston valve sections 225 and 226 and a drain line 229 leading back to the line 206. The drain line 229 carries a float valve 230 for eliminating from the line any trapped fuel vapors. The pump 208 is provided with a relief line 231 which is connected to opposite sides of the pump and carries a relief valve 232. A conduit 233 leads from the discharge side of the pump 208 and separates into two branches 234 and 235. The branch 234 is connected by a check valve 236 with the branch 213 associated with the pump 207. The branch 235 leads to the valve body 220 and communicates with the chamber between the piston valve sections 225 and 226 by means of openings 237 formed in the sleeve valve 221. The space above the piston valve 223 is connected by a line 238 with the conduit 204 and subjects the top side of the piston valve to the fuel pressure in the line 204. A coil spring 239 acts against the top of the piston valve 223 to urge it downwardly. An extension 240 formed on the top of the piston valve 223 limits upward movement of the piston valve. A short extension 241 formed on the lower side of the piston valve 223 limits its downward movement. The space below the piston valve 223 is connected by a line 242 having a restriction 243 to the discharge side of the transfer pump 160. Fundamentally, the control valve 219 for the pumps 207 and 208 operates from the difference in intake and discharge pressures at the apparatus included in body 114, for the upper end of piston valve 219 is subjected to the discharge pressure of the apparatus existing in line 204 and the lower end of the piston valve is subjected to the intake pressure of the apparatus existing in line 155 as communicated by line 242. Restriction 243 removes the effect of variations of intake fuel pressure of short duration, and also dampens oscillations of piston valve 219 from other causes. Spring 239, acting on the upper end of the piston valve 223 assures that the piston valve assume a certain position along the length of the valve sleeve 221 for a given difference in intake and outlet fuel pressures as transmitted to the ends of the piston valve.

A return line 244 leads from the line 216 to the conduit 159 on the intake side of the transfer pump 160. Communication between the lines 216 and 244 is regulated by a piston valve 245 under the control of a speed governor 246 responsive to turbine speed. A relief line 246$^a$ containing a relief valve 247 connects the intake and discharge sides of the transfer pump 160. A line 248 leads from the line 244 to the valve 217. A drain line 249 is connected to the valve 217. During normal operation the valve 217 passes fuel from the line 216 to the fuel divider 218. The valve is so constructed that when appropriately regulated, it connects the flow divider with the line 249 for draining the former and lines 216 and 248 for passing the entire flow of fuel to the discharge side of the transfer pump 160.

In operation of the above described apparatus, fuel is drawn from the fuel tank 156 through the booster pump 157 through conduits 158 and 159, the transfer pump 160, and the conduit 155 to the body 114, through which it passes to the annular recess 154 and thence through the orifice 153 and annular recesses 151 and 152 in the outer fixed sleeve valve 150 and past the upper edge of the movable inner sleeve valve 149 to the portion of the unmetered-fuel chamber 144 below the diaphragm 141. From there the fuel moves to the metered fuel chamber 143 to the left of wall 163 by way of the orifices 161 and 161$^a$, the sizes of which are regulated in accordance with temperature of air going to the burners, as measured by the element 172, and by desired temperature of products of combustion going from the burners to the gas turbine, as predetermined by an appropriate setting of the indicator 174. The orifices 161 and 161a jointly constitute metering orifice means, and the pressure of the fuel is reduced in accordance with the amount of restriction provided at these orifices by the needle valves 162 and 173, which adjust the orifices. Since the unmetered-fuel pressure is greater than the metered-fuel pressure, the diaphragm 141 will be urged upwardly with a force dependent upon the difference between these two fuel pressures, which difference is in turn dependent upon the square of the flow of fuel past the orifices 161 and 161a. The upward net force through fuel-pressure difference acting upon the diaphragm 141 is communicated to the rod 125. This upward force on the rod is opposed by a downward force on the rod dependent upon the difference in air pressures acting upon the upper and lower sides of the diaphragm 122 in the air chambers 117 and 121 and transmitted thereto from sensing elements 115 and 118. When the flow of fuel is proper for the flow of air, the air-pressure difference acting downwardly upon the diaphragm 122 is effectively balanced by the fuel-pressure difference acting upwardly on the diaphragm 141. Thus the valve 149 holds its position, and there is no change in the size of the regulating orifice formed by the valves 149 and 150. Let it be assumed, for the moment, that the valve 192 is open. If the flow of air to the burners changes in rate, this change will be sensed by the elements 115 and 118, and a changed difference in pressure will be transmitted to the diaphragm 122. If the rate of air flow increases, there will be a greater air pressure difference acting downwardly upon the diaphragm 122, and for the moment the upward fuel-pressure difference acting upon the diaphragm 141 will be effectively less than the air pressure difference acting upon the diaphragm 122. As a result, the rods 125 and 146 will move downwards causing the upper end of the movable sleeve valve 149 to provide less of a restriction to the recesses and passages in the outer fixed valve 150. Thus there is an increase in the size of the regulating orifice, and consequently, the flow of fuel increases. Since the fuel flow increases, the drop in pressure across the orifices 161 and 161a increases, and thus there is provided a greater fuel pressure difference acting upwards upon the diaphragm 141. When the increase in fuel-pressure difference effectively matches the increase in air-pressure difference, downward movement of the valve rods 125 and 146 and of the inner sleeve valve 149 ceases. Thus a new fuel flow has been established, which is appropriate to the new increased air flow. If the air flow decreases, the opposite of the above described takes place. The effective force of the fuel pressure difference acting upwardly upon the diaphragm 141 is greater than the effective force of the air pressure difference acting downwardly upon the diaphragm 122, and therefore, the rods 125 and 146 and the inner sleeve valve 149 move upwardly. This action decreases the size of the regulating orifice formed by the valve parts 150 and 151, and the fuel flow decreases. Thus the fuel-pressure drop across the orifices 161 and 161a is decreased, and a lower upward pressure acts against the diaphragm 141. Thus balance is restored between the air-pressure difference acting on the diaphragm 122 and the fuel-pressure difference acting on the diaphragm 141.

During the above described changes it has been presumed that the valve 192 was open, and this was the case if the turbine was not in the desired speed range, so that the solenoid was electrically energized to bring the core 197 to its lower position. Let it now be assumed that the turbine is operating in the desired speed range. Now the solenoid 196 is no longer energized, and the plunger 197 brings the valve 192 to closed position under the influence of the fuel pressure acting upwards against the diaphragm 195. Now fuel in the chamber 179a cannot escape by way of the line 182, chambers 183 and 189, orifice 191, chamber 193 and line 194, and the only outlet from the chamber 179a is through the passage 180, but this passage has the restriction 181, which provides a time delay to such escape. Thus the volume of fluid in the chamber 179a cannot change suddenly, and the diaphragm 126 cannot shift its position suddenly. Consequently, the rods 125 and 146 and the inner sleeve valve 149 cannot immediately move upwardly or downwardly in response to changes in air flow as transmitted as a pressure difference to the diaphragm 122. The rods and valve 149 can move only if there is sufficient time for fuel to flow through the restricted orifice 181 into or out of the fuel chamber 179a. Thus changes in air flow of a short duration have no effect upon the fuel flow, for temporarily the inner sleeve valve 149 remains in its original position, and there is no change in the size of the regulating orifice. Keeping the fuel apparatus from being sensitive to air-flow changes of a short duration prevents unstable operation of the apparatus, which may easily occur if the controls are made sensitive to changes of a short duration in the use of the apparatus with the power plant shown in Fig. 1.

If the air flow decreases sufficiently, the rod 125 will be urged upwardly with sufficient force to cause the compression of the trapped fuel in the chamber 179a to act against the diaphragm 184 sufficiently to lift it and thereby to provide the appropriate increase in space for the trapped fuel to permit the upward movement of the rods 125 and 146 and the inner sleeve valve 149 for reduction of the regulating orifice. Lifting of the diaphragm 184 takes place when the pressure in the chamber 179a has through compression risen from metered-fuel pressure up to or just above the unmetered-fuel pressure existing above the diaphragm 184. Thus for a large reduction in air flow there will be immediately provided an appropriate reduction of fuel flow as a precaution against overheating of the turbine due to too high a temporary ratio of fuel-flow rate to air-flow rate. The fuel flow will not immediately be reduced completely to the point where the ratio of fuel flow to air flow is the predetermined value, because this ratio can be obtained only when the fuel pressure in the chamber 179a is the same as that in fuel chamber 117, and these pressures will be equal only when sufficient fuel has escaped from the chamber 179a, and this requires time. A large increase in air flow will not immediately have the same effect, because the resultant increase in downward thrust upon the air diaphragm 122 will only tend to increase the volume of fuel trapped against immediate release from the space 179a and associated parts. This will tend to move the diaphragm 184 downwards to achieve compensation by reduction of the size of the chamber 183, but the projection 185, attached to the diaphragm prevents downward movement of the diaphragm.

Under starting conditions, it may be desirable to use a lower rate of fuel flow than may be allowed by the minimum position established by the idle spring 201. In this event, the rod 202ª is pushed upwards to raise the spring 201 and thereby to permit the inner sleeve valve 149 to move upwards in response to the air-pressure difference arising from low air flow and thereby reduce the regulating orifice to make possible the new desired minimum fuel flow. At other conditions it may be desirable to have a constant fuel flow, for example, a minimum flow permitted by the return of the idle spring 201 to the position shown in Fig. 3, regardless of the air conditions measured by the elements 115 and 118. In this event, the valve 200 is turned 90° from the position shown in Fig. 3 to place the portions of the air chambers 117 and 121 in direct communication with one another for equalizing as much as possible, the air pressures on the two sides of the diaphragm 122.

It has previously been assumed that the effective size of the metering orifice 161 has remained constant, because the temperature of air flowing to the burners has not changed, and therefore, the temperature-responsive element 172 has not acted through various described control means to adjust the longitudinal position of the needle valve 162. If now the temperature of air going to the burners increases, the needle valve 162 is moved to the right, reducing the effective size of the orifice 161. This means a greater restriction of the fuel flowing past the orifices and consequently, a lower fuel-flow rate for a given pressure drop across the orifices. As the size of the orifice 161 is decreased, the pressure drop may, for the moment, increase and this produces an upward movement of the rods 125 and 146 and the valve 149. Thus there is a reduction in flow through the regulating orifice formed of the valve parts 150 and 151, and this reduction in flow brings about a reduction in pressure difference across the orifices 161 and 161ª to obtain a return of the original fuel pressure difference acting on the diaphragm 141 to match the air-pressure difference acting on the diaphragm 122. Thus the rate of air flow has remained the same, but the rate of fuel flow has been decreased as the temperature of air flowing to the burners has increased. Thus the ratio of fuel to air has decreased, whereby there is provided a suitable balance for the increase of air temperature in maintenance of a constant temperature of products of combustion leaving the burners. Decrease in the temperature of air flowing to the burners has the opposite effect. In this case, the needle valve 162 moves to the left increasing the effective opening of the orifice 161. Thus the restriction of the flow of fuel across orifices 161 and 161ª is decreased, and there may be a similar pressure drop across these orifices. The decrease in pressure drop is transmitted to the diaphragm 141, which now receives less force to oppose the force applied by air pressure difference to the diaphragm 122, and the rods 125 and 146 and the valve sleeve 149 may move downwards to increase the size of the regulating orifice formed by the valve sleeves 150 and 151. This produces an increased fuel flow, increasing the pressure drop across the orifices 161 and 161ª to restore balance between the fuel-pressure forces acting against the diaphragm 141 and the air-pressure forces acting against the diaphragm 122. Thus the air-flow rate has remained the same, while the fuel flow rate has increased, and so there has been provided an increase in the ratio of fuel flow to air flow. Thus there is provided a compensation for the decrease in the temperature of air flowing to the burner in maintenance of a constant temperature of products of combustion flowing from the burners to the turbine.

If a greater temperature is desired for the products of combustion passing from the burners to the turbine, indicator 174 is moved in a clockwise direction thereby moving the needle valve 173 to the left and increasing the effective size of the orifice 161ª. Thus, for the moment, the pressure drop across the orifice is reduced for the flow of fuel remains constant, and the fuel-pressure difference acting upwardly against the diaphragm 141 is reduced. Thus the balance between the air-pressure forces and the fuel pressure forces is disturbed, and thus sleeve valve 149 moves downwardly increasing the regulating orifice formed between the valves 149 and 150. This increases the fuel flow and the pressure drop across the orifices 161 and 161ª. Thus balance is restored between the diaphragms 122 and 141. The air-flow rate has remained the same, and the fuel flow rate has increased. Thus there is an increase in the ratio of fuel flow to air flow, and since the temperature of air flowing to the burners has been assumed to remain constant, the increase in ratio of fuel to air must result in a greater temperature of products of combustion produced by the burner. Similarly the temperature of products of combustion may be reduced by greater restriction of the orifice 161 by the needle valve 173.

After the fuel passes through the metering orifices 161 and 161ª, it goes through the conduit 204 to the pumps 207 and 208. If the pump 207 is functioning properly, the entire output of the pump 208 will be bypassed, with the parts in the position shown in Fig. 3, through the openings 237, the space between the piston valve sections 225 and 226, the sleeve openings 228, and the return line 229 back to the intake side of the pump 208. A portion of the output of the pump 207 will be bypassed through the line 215, the sleeve openings 227, the space between the piston valve sections 225 and 226, the valve sleeve openings 228, and the return line 229 to the intake side of either pump 208 or pump 207. The portion of the output of the pump 207 that is not bypassed as aforesaid, is delivered through the line 216 and the valve 217 to the flow divider 218, whence it proceeds to the individual burners. The position of the valve 223 will determine the relative portions of the output of the pump 207 that are bypassed through the line 215 and delivered to the burners through the line 216. The position of the valve 223 is determined by the pressure of fuel above the valve piston section 225, which is by the difference between the pressure existing in the line 204 leading to the pumps 207 and 218 and the pressure in line 242, with the aid of the coil spring 239. If it be assumed that the pressure in line 242 is constant (and this is generally the case) then the greater the pressure in the line 204, the lower the position of the valve 223, the more the piston valve section 225 covers the ports 227, the less the amount of output by the pump 207 bypassed through the line 215 and the sleeve valve openings 227, and the greater the amount of the output of the pump 207 going through the line 216 to the flow divider 218 and to the openings. Thus there is a tendency to maintain the constant pressure in the line 204 or on the intake side of the pumps 207 and 208, for the greater this pressure becomes, the greater the relative amount of the pump output delivered to the burners. If pump 207 fails, presumably the output pressure of the pump falls very low, and the fuel pressure on the intake side reaches a high level. Consequently, two things happen: pump 208 delivers fuel through line 234, check valve 236, and lines 213, 214, and 216 to the flow divider 218; and the piston valve 223 is depressed under the increased fuel pressure in the line 204 until the sleeve valve openings 227 are completely closed, and the sleeve valve openings 237 are at least partially closed, thereby reducing the amount of fuel bypassed from pump 208 by way of line 235 and return line 229. If pump 207 again functions properly, pressure in the line 204 will be sufficiently lowered as a result of fuel delivered by pumps 207 and 208 to cause the piston valve 223 to rise until the output of pump 208 is bypassed by virtue of complete uncovering of the valve openings 237, and a portion of the output of pump 207 may be bypassed by a partial uncovering of the valve openings 227.

The term "air" when used in the claim is intended to mean any appropriate combustion-supporting medium.

I claim:

In combination, in a gas turbine power plant, a burner for the gas turbine for supplying gaseous products of combustion of fuel and compressed air thereto, means forming a path for the flow of fuel to the burner, means forming a path for the flow of compressed air to the burner, means forming a regulating orifice in said fuel path, means forming first and second metering orifices in parallel with one another in said fuel path, means associated with the metering orifices for making a measurement of the fuel-flow rate in the fuel path, means for making a measurement of the air-flow rate in the compressed air path, means responsive to the relation of the two just-named measurements for adjusting the regulating orifice to maintain a predetermined ratio of fuel-flow rate to air-flow rate at a given temperature of compressed air flowing to the burner, a temperature-sensing element for producing an electrical signal and being interposed at the entrance to the burner in the compressed air path, a restrictive member in the first metering orifice for adjustably restricting the first metering orifice, an electrical amplifier device having automatic means for adjusting the position of said restrictive member in the first metering orifice and being actuable by the electrical signal from the temperature-sensing element to increase the restriction and thereby increase the leanness of the fuel/air ratio in response to increase of compressed air temperature, a manually operated valve in the second metering orifice for adjustably restricting the second metering orifice, and manually set means having indicia and being connected to the valve for adjusting the restriction of the second metering orifice directly in order to select the desired temperature of combustion products as indicated by the said indicia so as to produce different predetermined values of temperature of combustion products.

PAUL W. WYCKOFF.

REFERENCES CITED

The following references are of record in the file of this patent:

UNITED STATES PATENTS

| Number | Name | Date |
|---|---|---|
| 1,370,532 | Fulton | Mar. 8, 1921 |
| 2,219,994 | Jung | Oct. 29, 1940 |
| 2,378,036 | Reggio | June 12, 1945 |
| 2,384,282 | Chandler | Sept. 4, 1945 |
| 2,400,415 | Hersey | May 14, 1946 |
| 2,405,888 | Holley | Aug. 13, 1946 |
| 2,414,322 | Mock | Jan. 14, 1947 |
| 2,440,241 | Armstrong | Apr. 27, 1948 |
| 2,447,261 | Mock | Aug. 17, 1948 |
| 2,447,265 | Beardsley | Aug. 17, 1948 |
| 2,447,267 | Mock | Aug. 17, 1948 |
| 2,457,595 | Orr | Dec. 28, 1948 |
| 2,486,223 | Stresen-Reuter | Oct. 25, 1949 |